Dec. 7, 1971  W. R. SWANSON ET AL  3,624,929
METHOD OF ELECTRICALLY COMPARING TEACHER AND STUDENT ANSWERS
Filed Aug. 27, 1970  2 Sheets-Sheet 1

INVENTORS,
WILLIS R. SWANSON
SIDNEY P. SWANSON
BY
*Christensen, Sanborn & Matthews*
ATTORNEYS

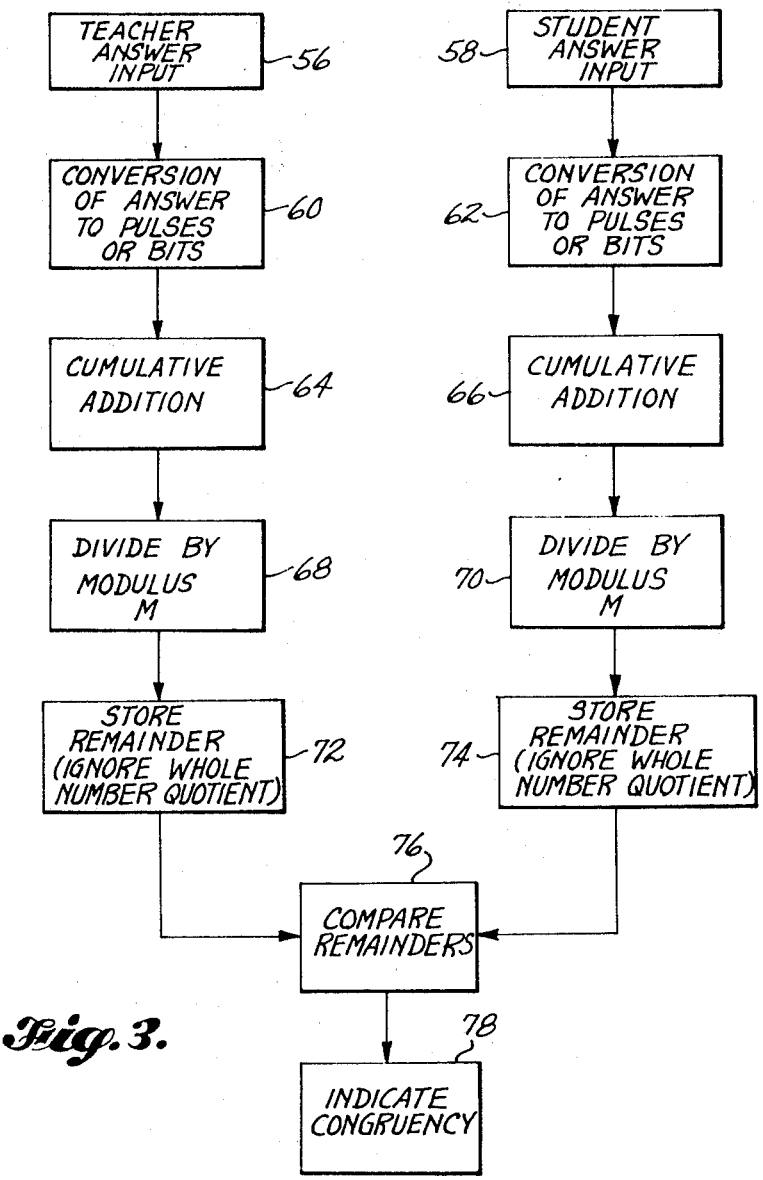

United States Patent Office 3,624,929
Patented Dec. 7, 1971

3,624,929
METHOD OF ELECTRICALLY COMPARING TEACHER AND STUDENT ANSWERS
Willis R. Swanson, deceased, late of Fulford Harbour, British Columbia, Canada, by Naola J. Swanson, executrix, Fulford Harbour, British Columbia, Canada, and Sidney P. Swanson, 101 S. Dorothy Drive, Richardson, Tex. 75080
Filed Aug. 27, 1970, Ser. No. 67,313
Int. Cl. G09b 7/00
U.S. Cl. 35—48
4 Claims

ABSTRACT OF THE DISCLOSURE

In the operation of teaching apparatus, a method of comparing student and teacher answers employing congruency as a test of "correctness" or equivalence. In the disclosed method both the teacher's answer and student's answers are expressed in terms of one or more alpha-numeric symbols, which for each answer are encoded into equivalent numbers of code signal elements, totalled and divided by a common modulus to obtain a remainder code. A comparison of the remainder codes indicates in most cases statistically whether the answers are the same or not.

BACKGROUND AND SUMMARY OF THE INVENTION

This invention relates to teaching techniques, and in particular it relates to a method for application in a teaching system or apparatus to the processing of teacher and student answers by use of a congruency comparison principle. The illustrated embodiments demonstrate the basic principles of the invention.

In recent years many attempts have been made to improve techniques used in the educational process, which involvese two basic aspects: presentation and response. Most of the improvements have emphasized the first aspect and have been relatively effective in enhancing and rendering more efficient the presentation of information to students. On the other hand, significant improvements in techniques and equipment applicable to the response side of the educational process have been notably lacking, while increasing numbers of students per classroom and the flood of new technical information to be taught have greatly increased the need for improvements in this area.

Basic experiments in learning techniques have shown that learning is enhanced when the student is actively participating in the learning process, as contrasted with a passive spectator role of being merely exposed to information. Other essential aspects of the learning process include prompt scoring of answers and prompt reward for correct answers, active student construction of answers from the student's own independent thinking in answer to questions, repetitious relearning of the same information and concepts in a variety of different ways, and a continuing increase in the challenge of learning by increasing the level of difficulty to match the student's ability to absorb and develop. Tests have also shown that it is detrimental to have incorrect answers and correct answers presented at the same time, such as in multiple-choice questions, since the incorrect answers tend to get confused in the mind of the student with those which are correct.

Existing devices for assisting the student in the response phase of the learning process and for comparing students' and teacher's answers have had a number of disadvantages. The general problem confronted by this invention is that of providing apparatus whose operation meets the requirement of the above-noted basic learning principles, without the complexity and expense associated with heavily computerized teaching machinery and systems. Conventional computers programmed to operate as teaching machines are illustrative of the ultra-sophisticated response devices utilized heretofore. Each student is provided with an electronic encoding typewriter connected to the computer. The computer types out preprogrammed questions and the student types answers for the computer to score in comparison with the preprogrammed correct answers. Such a system cannot utilize the unique human characteristics of a teacher's adaptability to individual learning situations and student development capability, and it involves tremendous initial investment and maintenance and operational costs associated with construction and modification of programs, not to mention the expense and time associated with the required teacher training. As a consequence, few schools can afford such equipment and few students have the benefit.

Accordingly, the primary object of this invention is to provide a method of operation for teaching apparatus which permits the use of relatively simple and inexpensive equipment while also permitting the use of teaching techniques conforming to the above-noted basic requirements for variety, student participation, individual teacher monitoring, prompt scoring of answers, etc.

A related object is to provide a rapid communication medium whereby the student's progress at each step of learning can be monitored and the teaching strategy adapted to the changing conditions and needs during the learning process.

More specifically, it is a primary object of this invention to provide a method of operation for teaching apparatus which is based on a congruency determination to enable a simplified comparison of answers whether the word answer given, for example, is long or short. A related object is to provide an operational method which eliminates the necessity for comparing each letter of a student's word answer to the corresponding letter of the teacher's answer to reach a correctness determination.

Still another object is to provide a method whereby the teaching apparatus can be controlled manually or automatically, or by a combination of manual and automatic control, and utilizes the teacher's unique human ability to adapt teaching progress to changing conditions in the classroom based on immediate determinations of student progress.

Still another object is to provide a method of operation which permits use of the apparatus for alpha-numeric characters in any language or with any specialized symbols associated with a particular field of knowledge, without additional significant expense.

A further object of the invention is to provide a method of operation which permits use of the teaching apparatus with a minimum of specialized instruction or alteration in teaching technique.

An example of congruency, the concept upon which this invention is based, is the relationship between two numbers which, when divided by a third number, called the modulus, give the same remainder. For instance, the two numbers 7 and 23 are said to be congruent with respect to the modulus 4, because when divided by four they have the same remainder. In a broader sense, congruency is defined as the relationship between any two series of numbers which, when the members of each series are operated upon by the same or equivalent cyclical patterns of algebraic operations, the resultant (expressed in any code form) is the same. For example, two series of numbers can be tested for congruency by a solid state counter capable of either adding or subtracting and being of the cyclical divide-by-modulus 16 type, with the resultant being expressed in a multi-element code of high-low voltages. The counter may be programmed to add the first digit in the series, subtract the second digit, add the third, and so forth in alternating pattern. If the final resultant code is the same after processing each of the two series, then the two series would be said to be of the same congruent class. The significant requirement for this particular form of congruency is that the pattern of algebraic operations is the same or algebraically equivalent for both series.

In accordance with this invention the congruent number processing technique is utilized, the letters of each word answer being encoded into equivalent electrical or mechanical signal elements which are added, and the total is divided by a single modulus to obtain a relatively small congruent remainder number. This form of operation permits particularly simple and relatively inexpensive apparatus to be used for storage and comparison of a student's whole word answer to that of the teacher's answer without the conventional process of comparing one letter at a time and attendant large capacity memories and expensive computerized equipment.

An explanation of the theoretical basis for the invention and the statistical probabilities associated with congruency determinations proceeds from the mathematical logic of the familiar true-false tests to the more generalized congruent remainder method basic to the invention. In true-false (modulus 2) answer responses it is common to subtract the number of wrongs from the number of rights to remove any undeserved guess premium in the computed adjusted score. In like manner, for any number (modulus) of alternate multiple choices it is possible to remove the guess premium by applying the following equation:

$$\text{Adjusted Score} = \text{Rights} - \frac{\text{Wrongs}}{\text{Modulus} - 1} \quad (1)$$

For example, where four alternate choices are involved, such as in a multiple choice test (0, 1, 2, 3 or modulus 4) the answer processing equipment requires means to encode, store and compare four items. There remains an irreducible 1 in 4 guess factor, irrespective of the sophistication of the answer processing equipment. Similarly, for a number having two digits or more it appears necessary without the teachings of this invention to have proportionately more apparatus to store and compare each digit one-at-a-time in order for the student's whole number answer to be compared to that of the teacher's answer.

The following illustrations use small numbers for simplicity although the full benefits of the processes are particularly effective for long answers or text passages. Using the method of this invention the answer number 57 might be encoded by addition, namely 5+7=12, where 12 would be the coded equivalent of the original answer. However, because there are also other combinations of two digits whose sum would be 12, these other "false" answers would be scored as "correct" as shown on the following table:

TABLE I.—CONGRUENT SCORING UNCERTAINTY FOR TWO DIGIT NUMBER-ANSWER

| Answers scored as "Correct" | Encoding process | Resulting answer code |
|---|---|---|
| 39 | 3+9= | 12 |
| 48 | 4+8= | 12 |
| 57 True answer. | 5+7= | 12 |
| 66 | 6+6= | 12 |
| 75 | 7+5= | 12 |
| 84 | 8+4= | 12 |
| 93 | 9+3= | 12 |
| 02 ⎫ | 0+2= | 2 |
| 11 ⎬Incorrect. | 1 1= | 2 |
| 20 ⎭ | 2 0= | 2 |

Thus out of the total of 100 items (00 through 99) there are a total of 6 (or 6%) incorrect answers whose digits would total 12 and would be scored as "correct."

When these coded answers are tested for congruency with respect to the modulus 10, the answer code 12 cannot be distinguished from the answer code 2, as is the case for the last 3 items in Table I. Consequently, there remains the same 1 in 10 guess factor of the total 100 cases for two digit answers as for the original one digit answer case. Because these ten answers have the same remainder when divided by 10 they fulfill the classical definition of congruency. The remaining 90 (of 100) digit answers do not have a remainder of 2 with respect to division by 10, and consequently are scored as incorrect. Therefore, the process always scores correct answers as correct and scores 90 percent of the incorrect answers as incorrect. By applying Equation 1, the raw score can be properly adjusted to eliminate the guess premium.

The general trend of opinion among educators is that scores in excess of 95% correct should occur to provide maximum student learning-reinforcement. If the difficulty is adjusted to that general level, than on the average the previously mentioned 6 percent guess premium applies only to the remaining five percent of the questions. Consequently, the actual guess premium is 6%×5% or 0.3%.

Table II illustrates variations in the guess premium as a function of the modulus of the division process used in the congruent answer comparing method under the conditions cited:

TABLE II.—GUESS PREMIUM AS A FUNCTION OF THE CONGRUENT DIVISION MODULUS

| Division modulus | Guess premium in percent | |
|---|---|---|
|  | All guessed | 5% guessed |
| 2 | 50 | 2.5 |
| 4 | 25 | 1.25 |
| 8 | 12.5 | 0.625 |
| 10 | 10.0 | 0.50 |
| 16 | 6.25 | 0.312 |
| 18 | 5.55 | 0.277 |
| 20 | 5.55 | 0.277 |

From Table II it may be seen that the guess premium decreases as the modulus increases until the modulus reaches 18, after which no improvement in guess premium occurs. Because the highest two-digit number is 99, whose digit total is 9+9=18, there is no advantage of going beyond modulus 18. In fact, there is only a 0.035% guess premium improvement in exceeding modulus 16, which happens to be a commonly available binary type counter unit. Another way of stating the above principle is: there are only three numbers, 89, 98, 99, out of the total 100 two-digit numbers, whose digit sum exceeds 16. These considerations help to define the design parameters of the digit-sum congruent answer-processing method. For example, in the design of apparatus adapted to utilize the method according to this invention the parameters of Table II may be used to logically balance the expense of the equipment in terms of cost per transistor-resistor logic unit against the resulting answer-scoring guess premium performance improvement.

A telephone-type dial, button keyboard or other means may be used for encoding either numbers or letters to spell out an answer-word of any length. The overall process is as useful for answer-words or text passages as for numbers, and the length of the answers has substantially no effect on the machine requirements. The same simple and relatively inexpensive apparatus necessary for the storage and comparison of a single character can be used, without modification, for the storage and comparison of answers of any length and of either the numerical or word-text types.

In order to carry out the foregoing objects and principles the invention provides a method of camparing teacher and student answers in an education process or apparatus, wherein each answer is typically expressed as one or more alpha-numeric symbols. These symbols for each answer are encoded into an equivalent number of discrete code signal elements or bits, and the elements or bits for each answer are totalled to obtain an answer code. The respective answer codes are divided by a predetermined modulus to obtain a remainder code expressed as an apparatus or circuit condition, the whole number quotient being ignored. Finally, the remainder conditions are compared, by determining coincidences or noncoincidence of the remainder conditions, and if the student answer remainder is the same as the teacher's answer remainder, then congruency exists and the answer is scored as correct.

The addition and division steps are preferably performed on a cumulative basis as the alpha-numeric symbols for the answers are provided, so that the remainder is obtained at the same time that formulation of answer encoding is complete, whereupon congruency comparison takes place immediately to provide a real-time comparison and score.

These and other features, objects and advantages of the invention will become more apparent from the following detailed description of the invention in conjunction with the accompanying drawings illustrating the preferred form of the invention.

BRIEF DESCRIPTION OF THE DRAWINGS

FIG. 3 is a block diagram illustrating the separate functions performed in accordance with the invention.

DESCRIPTION OF THE PREFERRED EMBODIMENT

Figure 1:
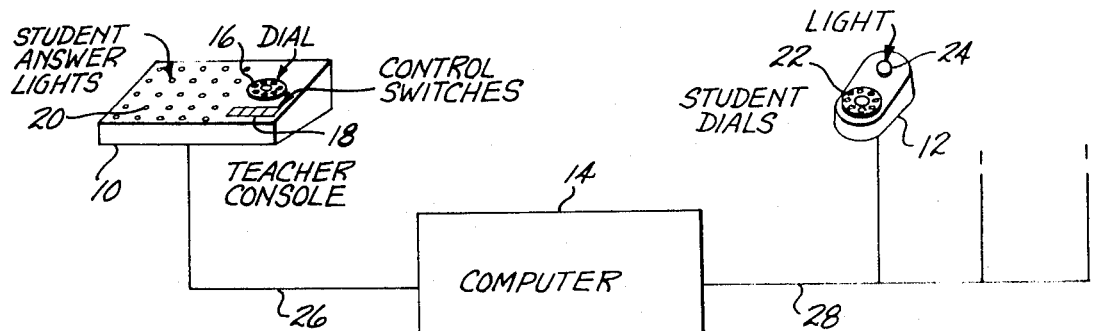
FIG. 1 is a partially pictorial block diagram of apparatus for carrying out the method according to the invention.

Apparatus for performing the method in accordance with the invention includes a teacher's console 10, a plurality of student station units 12 and a computer 14. The teacher's console 10 includes an instrument panel having a telephone-type dial 16 or other suitable answer input device, a plurality of control switches 18 and a student light panel 20 in which the lights corresponding to student units 12 are preferably arranged in rows corresponding to the positions of the students' desks. Each student's unit 12 includes a telephone-type answer dial 22 and a light 24 for indicating whether his answer is correct. The unit preferably also includes means (not shown) for clamping or otherwise fastening the unit to the student's desk. Cables 26 and 28 connect the teacher's console and the respective student units to the computer 14 for computation of answer correctness in accordance with the invention. Correctness indications are transmitted back to both the teacher's console and the student units when determined under control of the teacher.

After the teacher presents a question to the class, the teacher and each student dial the letters or numbers on their respective dials and their answers are transmitted to the computer in the form of electrical pulses via the cables 26 and 28. The teacher and student answer input devices may alternatively comprise telephone-type "touch-tone" buttons or other suitable keyboard devices capable of converting manually selected alpha-numeric symbols into electrical signals which can be handled by the computer. In the case of the tone button type input, the different frequencies transmitted may be converted to pulses in a known manner, for example, for processing by digital logic circuitry in the computer. The symbols associated with the dials can be easily changed to adapt the system and method to any language or system of technological symbols without any internal change in the equipment.

Figure 2:
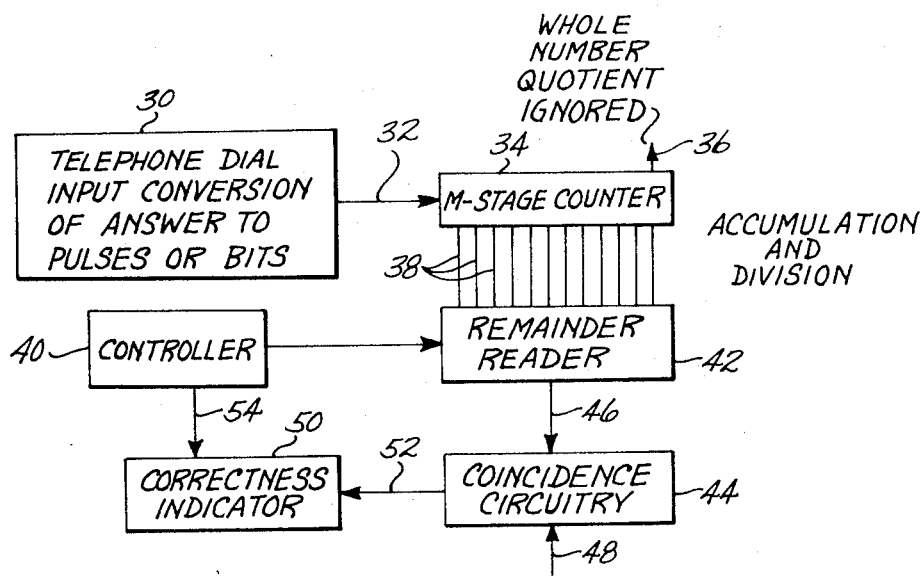
FIG. 2 is a more detailed block diagram showing apparatus of a type adapted to carry out the invention.

Operation of the input dial or other input device on the part of the teacher or the student effects the first two steps in the answer analysis process, namely manual selection of alpha-numeric symbols which make up the answer, and conversion of these symbols into electrical signals for processing in accordance with the invention. These steps are represented by the block 30 in FIG. 2, and the resulting pulses or bits are transmitted on line 32 to a simple M-stage digital counter 34 for example. The counter performs the functions of addition or accumulation of the pulses representing the letters or numbers making up the selected answer, and division of the accumulated total by a modulus M equal to the number of utilized stages in the counter. That is, each time the counter "fills up" an output appears at the quotient output 36 (the last utilized stage) representing the total number of pulses received by the counter, divided by the number of stages utilized. This whole number quotient is ignored in the answer processing method according to the invention.

The individual outputs 38 of the separate counter stages provide signals indicating the remainder, if any, after division of the accumulated total by the modulus M. This counter arrangement is of the class sometimes designated as the divide-by-modulus (or modulo) M type. The remainder is continuously indicated by the collective outputs of the counter 34 and thus can be read at any time. Of course, as a practical matter, it is only read when the answering stage of the process has been completed or the time limit for answering set by the teacher has expired. At the end of this time the teacher operates a control switch on the panel 18 (FIG. 1), causing the controller 40 (FIG. 2) in the computer to actuate a plurality of remainder readers 42 to read the remainders of all the counters containing the teacher and student answers. A single remainder reader can be employed with multiplexing means for effecting a sequential reading of the different answer counters 34 in the system. In the illustrated embodiment, however, the remainder reader 42 comprises another counter, for example, such as a stepping switch or a digital counter which counts up to the last energized output of the counter 34 and stops at this position or state. The position or condition of each student remainder reader or counter 42 is then compared by suitable coincidence logic circuitry 44 with the position or state of the teacher remainder reader, a corresponding signal being supplied at input 48, and a coincidence (or noncoincidence) signal is produced. This signal is applied through line 52 to the indicator 50 where a correctness indication is provided.

The comparator or coincidence circuitry 44 comprises any suitable logic circuitry capable of indicating coincidence between the teacher remainder reader and each of the student remainder readers and providing a suitable output signal indicating congruency or noncongruency. The correctness indicator 50 preferably comprises an indicator light on the student answer light panel 20 of the teacher's console 10 (FIG. 1) and a corresponding light 24 on each of the student answer units 12. The correctness indication is given immediately following termination of the answering time set by the teacher and under her control by operation of the control switches on panel 18 in the teacher console, which in turn operates the controller 40 (FIG. 2) in the computer. The same switch which controls the remainder readers 42 may also control the correctness indicator, or a separate correctness control, represented by line 54, may be provided so that at the end of the answering period the student answers may be read by the computer, but a correctness indication delayed until after additional discussion in the classroom. The correctness indicator 50 may also include suitable printing means (not shown) for providing a permanent record or score for each student. Such a printout may be a part of or coupled to the teacher console for continuous monitoring of student progress and to assist in grading.

The foregoing answer analysis operations by the apparatus disclosed are shown in the step-by-step block diagram of FIG. 3. The teacher answer input step 56 and the respective student answer input steps 58 are performed by manual dialing or operation of push-buttons, whereupon the selected answers are converted to an answer code in the form of pulses or digital numbers in steps 60 (teacher) and 62 (students). Answer analysis is begun at steps 64 and 66 wherein cumulative addition of the pulses or code numbers representing the answer components (letters or numbers) is performed preferably simultaneously with input of the answer codes representing the respective selected answers. These steps are performed as previously discussed by M-stage counters 34 coupled with each teacher and student answer input device. At the same time the division steps 68 and 70 are also performed by the counters 34, and the whole number quotients are ignored while the remainders at the end of the answering step are represented by the counter outputs and stored in steps 72 and 74 in the form of counter conditions or stepping switch positions. The coincidence circuitry compares the remainder counter conditions or positions in step 76, and a congruency indication is given in the final step 78.

The invention thus provides a simplified operation for teaching apparatus which permits answer analysis without necessity for meticulous comparison of each letter or number comprising the teacher's answer with each letter or number comprising each student's answer, thereby simplifying the equipment required and reducing costs so that the equipment can be made available to larger numbers of schools and students. Other advantages and modifications within the scope and spirit of the invention will be recognized by persons skilled in the art.

What is claimed is:

1. In the operation of teaching apparatus, a method of comparing teacher and student answers, comprising:
    (1) encoding the teacher answer and each student answer into discrete numbers of code signal elements, respectively;
    (2) electrically dividing each of said numbers by a predetermined modulus and deriving apparatus conditions representing the remainders from said divisions, respectively;
    (3) electrically comparing each apparatus condition representing a student answer remainder with the apparatus condition representing the teacher answer remainder to detect coincidence or noncoincidence of said conditions; and
    (4) indicating said coincidence or noncoincidence.

2. The method defined in claim 1 wherein each of said answers is initially expressed in terms of a series of manual selections of alpha-numeric symbols collectively comprising the answer, and wherein said encoding step includes converting each of said selected symbols into a separate number of code signal elements and electrically accumulating said numbers to derive an encoded total number representing the answer.

3. The method defined in claim 2 wherein said accumulating step and said division step are performed substantially simultaneously and continuously with selection of said symbols whereby said remainder is expressed as an apparatus condition upon termination of answer symbol selection.

4. The method defined in claim 3 wherein said accumulation and division steps are performed by a counter of the divide-by modulus M type, where M is the number of utilized stages in said counter.

References Cited

UNITED STATES PATENTS

| | | | |
|---|---|---|---|
| 3,579,861 | 5/1971 | Hallett | 35—48 |
| 2,955,756 | 10/1960 | Jensen | 235—61.7 A |
| 3,033,450 | 5/1962 | Zitnik | 235—61.7 A |

ROBERT W. MICHELL, Primary Examiner

J. H. WOLFF, Assistant Examiner

U.S. Cl. X.R.

235—61.7 A